United States Patent Office

2,831,770
Patented Apr. 22, 1958

2,831,770
ENRICHMENT OF CEREAL GRAINS

Thomas Antoshkiw, Arlington, N. J., assignor to Hoffmann-La Roche Inc., Nutley, N. J., a corporation of New Jersey No Drawing. Application June 22, 1954
Serial No. 438,627

9 Claims. (Cl. 99—11)

This invention relates to the enrichment of grain products, more particularly, to the enrichment of cereal grains with vitamins and minerals. A particular aspect of our invention relates to the enrichment of dehulled rice and corn grits with vitamin $B_2$ (riboflavin).

Commercial milling of cereal grains such as rice and corn grits removes much or all of the vitamins and minerals occurring naturally in the cereal grain. Cereal grains, after the milling process, are frequently fortified with vitamins and minerals to restore the lost nutrients. The white rice and corn grits of commerce are generally enriched with vitamin $B_1$, niacin and iron.

Vitamin $B_2$ is also substantially removed in the milling of cereal grains and it is desirable to restore this essential vitamin. However, when a cereal grain is enriched with vitamin $B_2$, a yellow-orange color is imparted to the grain particles which distinguishes the vitamin $B_2$ enriched material from the conventional product of commerce and makes it unacceptable to consumers. In a product in which the enriched material is incorporated in the form of a premix, the colored grains might be individually removed from the mixture (especially during cooking) and thus the benefits of the vitamin and mineral enrichment are lost to the user. Coatings which are conventionally applied to fortified rice and corn grits fail to mask the color.

According to this invention vitamin $B_2$ may be incorporated in cereal grains such as rice and corn grits without distinguishing the product in appearance from conventional cereal grains enjoying consumer acceptance. By the present process, the milled cereal grain is impregnated with vitamin $B_2$ and the fortified grain is then coated with an edible, protective coating material containing titanium dioxide in suspension. The milled cereal gain is impregnated with vitamin $B_2$ in an acid solution such as an aqueous mineral acid, e. g. sulfuric acid. Any vitamin $B_2$-active material which is soluble in aqueous acidic media may be used. Thiamine (vitamin $B_1$) and niacin may also be incorporated in the acid solution. After drying, the grain is coated with a layer of protective material containing titanium dioxide in suspension. The protective coating applied to the enriched cereal grain comprises a corn protein or prolamine, such as zein or other edible, water repellent film. The titanium dioxide is employed in a proportion of about 15-60% based on the amount of coating solution in which it is suspended (weight/volume), e. g. 15 to 60 grams of titanium dioxide to 100 cc. of coating solution. A lower aliphatic alocohol such as ethanol or isopropanol is used as the solvent in the coating solution. In addition, an adhesive agent, such as abietic acid, and a plasticizer, such as a higher fatty acid, e. g. stearic acid, palmitic acid, oleic acid, etc., may be included in the protective coating. Preferably, talc is dusted onto the enriched cereal grain while the coating material is still tacky. Minerals such as iron (in the form of an iron compound, e. g. iron pyrophosphate) may also be added to the cereal grain, for example, in the dusting powder.

The vitamins and minerals may be added to all of the grain kernels or a highly fortified premix may be prepared. Preferably a premix is formed by fortifying a portion of the cereal grain with a highly concentrated amount of vitamins and minerals in the manner described above. The premix is then mixed with unenriched milled cereal grain in a proportion of about 1 part enriched grain to about 199 parts of unenriched grain to produce a total mixture fortified with the desired proportions of vitamins and minerals.

Cereal grains such as rice and corn grits, when vitamin enriched and coated with a protective coating containing titanium dioxide according to this invention, closely resemble commercially available forms and are not readily distinguishable from them.

Example 1

A solution containing 10 grams of concentrated sulfuric acid, 22 grams of water, 1.4 grams vitamin $B_2$, 18 grams of niacin and 3.06 grams of vitamin $B_1$ was poured over 1,952 grams of medium grain rice in an open vessel with rapid mixing. The mixing was continued for 10 minutes. The vitamin impregnated rice was then dried in a current of warm air for 2 hours at 110° F.

A coating solution containing 30 grams of zein, 19.6 grams abietic acid, 24.3 grams Neo Fat 1–65 (a commercially available fatty acid mixture comprising 90% stearic acid, 6% palmitic acid and 4% oleic acid), 206.25 cc. of isopropanol and 7.5 cc. of water was prepared. 25 grams of titanium dioxide were slurried in 135 cc. of the coating solution. The titanium dioxide containing coating solution was then applied to the vitamin enriched rice kernels by stirring the enriched rice in the solution. While the rice was still wet, a mixture of 62 grams of iron pyrophosphate and 90 grams of talc was dusted onto the rice. The coated rice was mixed for a few minutes and then dried in a current of warm air for one hour at 110° F. The balance of the coating solution was then applied to the dry rice kernels and an additional 67.5 grams of talc were dusted onto the wet mixture. The rice was mixed 15 minutes and then dried at 110° F. for 2 hours.

Example 2

A vitamin solution containing 98 grams of water, 32 grams sulfuric acid, 5.84 grams vitamin $B_2$, 64 grams niacin and 9.1 grams vitamin $B_1$ was poured while warm over 1,580 grams of corn grits in an open vessel with rapid mixing. Mixing was continued for 10 mintues and then the vitamin impregnated corn grits were dried in a current of warm air for 2 hours at 110° F.

A coating solution containing 71.5 grams of zein, 78.3 grams abietic acid, 28.93 grams Neo Fat 1–65, 639 cc. of isopropanol and 17 cc. of water was prepared. 100 grams of titanium dioxide were slurried in 400 cc. of the coating solution. The slurry was then applied to the vitamin impregnated corn grits by stirring the corn grits in the slurry. While still wet, a mixture of 247 grams of iron pyrophosphate and 146 grams of talc was applied to the corn grits as a dusting powder. The impregnated and coated corn grits were mixed for a few minutes and then dried for one hour at 110° F. The balance of the coating solution was then applied to the dry corn grits. An additional 80 grams of talc were dusted onto the grain. The enriched and coated corn grits were mixed for 5 minutes and then dried in a current of warm air at 110° F.

I claim:

1. A cereal grain fortified with a vitamin $B_2$-active substance and coated with an edible, water repellent coating containing titanium dioxide in suspension throughout the coating.

2. Rice fortified with a vitamin $B_2$-active substance and coated with an edible, water repellent coating containing titanium dioxide in suspension throughout the coating.

3. Corn grits fortified with a vitamin $B_2$-active substance and coated with an edible, water repellent coating containing titanium dioxide in suspension throughout the coating.

4. A cereal grain impregnated with water soluble vitamins including vitamin $B_2$ and coated with an edible, water repellent coating containing titanium dioxide in suspension throughout the coating.

5. A cereal grain according to claim 4 wherein the coating comprises zein.

6. An enriched rice comprising a rice kernel impregnated with a vitamin $B_2$-active material and coated with a protective coating comprising zein, abietic acid, an edible higher fatty acid and titanium dioxide suspended throughout the coating.

7. A method for enriching cereal grains with vitamin $B_2$ which comprises impregnating the grain kernel with an aqueous acid solution containing a vitamin $B_2$-active substance and coating the enriched grain with an edible, water repellent coating containing titanium dioxide in suspension throughout the coating.

8. A method for enriching rice which comprises impregnating rice kernels with an aqueous acid solution containing a vitamin $B_2$-active substance and coating the enriched rice with an edible, water repellent coating comprising zein and 15–60% titanium dioxide suspended throughout the coating.

9. An enriched rice comprising a rice kernel impregnated with vitamin $B_1$, vitamin $B_2$ and niacin and coated with a protective coating comprising zein, abietic acid, an edible higher fatty acid, isopropanol and 15–60% titanium dioxide suspended throughout the coating.

References Cited in the file of this patent

UNITED STATES PATENTS

| | | |
|---|---|---|
| 576,860 | Lanaux | Feb. 9, 1897 |
| 2,206,278 | Dreyfus | July 2, 1940 |
| 2,508,477 | Stievater et al. | May 23, 1950 |
| 2,712,499 | La Pierre | July 5, 1955 |
| 2,775,521 | Mateles | Dec. 25, 1956 |

OTHER REFERENCES

"Paint and Varnish Technology," by von Fischer, Reinhold Publishing Corporation, 330 West 42nd St., New York, 1948, page 300.